(12) United States Patent
Tubi et al.

(10) Patent No.: US 9,960,977 B2
(45) Date of Patent: May 1, 2018

(54) TECHNIQUES TO IDENTIFY APPLICATION FOREGROUND / BACKGROUND STATE BASED ON NETWORK TRAFFIC

(71) Applicant: Facebook, Inc., Menlo Park, CA (US)

(72) Inventors: Lior Tubi, Tel Aviv (IL); Nimrod Priell, Tel Aviv (IL); Israel Nir, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 492 days.

(21) Appl. No.: 14/638,360

(22) Filed: Mar. 4, 2015

(65) Prior Publication Data

US 2016/0261472 A1 Sep. 8, 2016

Related U.S. Application Data

(60) Provisional application No. 62/127,271, filed on Mar. 2, 2015, provisional application No. 62/127,251, filed on Mar. 2, 2015.

(51) Int. Cl.
*G06F 15/173* (2006.01)
*H04L 12/26* (2006.01)
*H04L 29/08* (2006.01)

(52) U.S. Cl.
CPC ........ *H04L 43/065* (2013.01); *H04L 43/0876* (2013.01); *H04L 67/22* (2013.01); *H04L 43/067* (2013.01)

(58) Field of Classification Search
None
See application file for complete search history.

(56) References Cited

U.S. PATENT DOCUMENTS

| 6,466,925 | B1* | 10/2002 | Harald | H04L 41/145 706/16 |
| 9,756,677 | B2* | 9/2017 | Backholm | H04L 69/16 |
| 2009/0019149 | A1* | 1/2009 | Cohen | G06F 17/30056 709/224 |
| 2013/0311643 | A1* | 11/2013 | Kulkarni | H04L 43/0852 709/224 |
| 2014/0280896 | A1* | 9/2014 | Papakostas | H04W 4/001 709/224 |

(Continued)

*Primary Examiner* — Brian Whipple

(57) ABSTRACT

Techniques to identify application foreground/background state based on network traffic are described. In one embodiment, an apparatus may comprise a traffic monitoring component and a traffic analysis component. The traffic monitoring component may receive monitored network traffic over a monitored time period. The traffic analysis component may receive a foreground activity profile, the foreground activity profile comprising one or more signals for distinguishing between foreground activity of one or more profiled applications and background activity of the one or more profiled applications; determine one or more active foreground applications in the monitored network traffic based on the foreground activity profile, wherein determining the one or more active foreground applications comprises determining that at least a portion of the monitored network traffic comprises background activity; and log that the one or more active foreground application were active during the monitored time period. Other embodiments are described and claimed.

20 Claims, 11 Drawing Sheets

(56) References Cited

U.S. PATENT DOCUMENTS

| | | | |
|---|---|---|---|
| 2014/0321448 A1* | 10/2014 | Backholm | H04W 76/045 370/338 |
| 2014/0380332 A1* | 12/2014 | Mathur | H04L 29/06 718/104 |
| 2015/0127819 A1* | 5/2015 | Cimino | H04L 43/0876 709/224 |
| 2017/0171906 A1* | 6/2017 | Backholm | H04W 76/045 |

* cited by examiner

600

Receive monitored network traffic from one or more network interface controllers, the monitored network traffic exchanged with a plurality of client devices over a monitored time period.
602

Receive a foreground activity profile, the foreground activity profile comprising one or more signals for distinguishing between foreground activity of one or more profiled applications and background activity of the one or more profiled applications.
604

Determine one or more active foreground applications in the monitored network traffic based on the foreground activity profile, wherein determining the one or more active foreground applications comprises determining that at least a portion of the monitored network traffic comprises background activity.
606

Log that the one or more active foreground application were active during the monitored time period.
608

*FIG. 6*

TECHNIQUES TO IDENTIFY APPLICATION FOREGROUND / BACKGROUND STATE BASED ON NETWORK TRAFFIC

CROSS-REFERENCE TO RELATED APPLICATIONS

This application claims the benefit of, and priority to, U.S. Provisional Patent Application No. 62/127,271, titled "Techniques to Identify Application Foreground/Background State Based on Network Traffic,", filed Mar. 2, 2015, and U.S. Provisional Patent Application No. 62/127,251, titled "Techniques to Identify Applications Based on Network Traffic,", filed Mar. 2, 2015, the entirety of which are incorporated herein by reference.

BACKGROUND

Mobile devices may run applications, commonly known as "apps," on behalf of their users. These apps may be distributed through one or more app repositories provided by the first-party manufacturer of the device or operating system or through a third party. These apps may engage in network activity on the mobile device, such as through a cellular or Wi-Fi network. Users may install apps, use apps while they are installed, have them installed without using them, and uninstall them.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to identify application foreground/background state based on network traffic. Some embodiments are particularly directed to techniques to identify application foreground/background state based on network traffic for the generation of application usage statistics. In one embodiment, for example, an apparatus may comprise a traffic monitoring component and a traffic analysis component. The traffic monitoring component may be operative to receive monitored network traffic from one or more network interface controllers, the monitored network traffic exchanged with a plurality of client devices over a monitored time period. The traffic analysis component may be operative to receive a foreground activity profile, the foreground activity profile comprising one or more signals for distinguishing between foreground activity of one or more profiled applications and background activity of the one or more profiled applications; determine one or more active foreground applications in the monitored network traffic based on the foreground activity profile, wherein determining the one or more active foreground applications comprises determining that at least a portion of the monitored network traffic comprises background activity; and log that the one or more active foreground application were active during the monitored time period. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
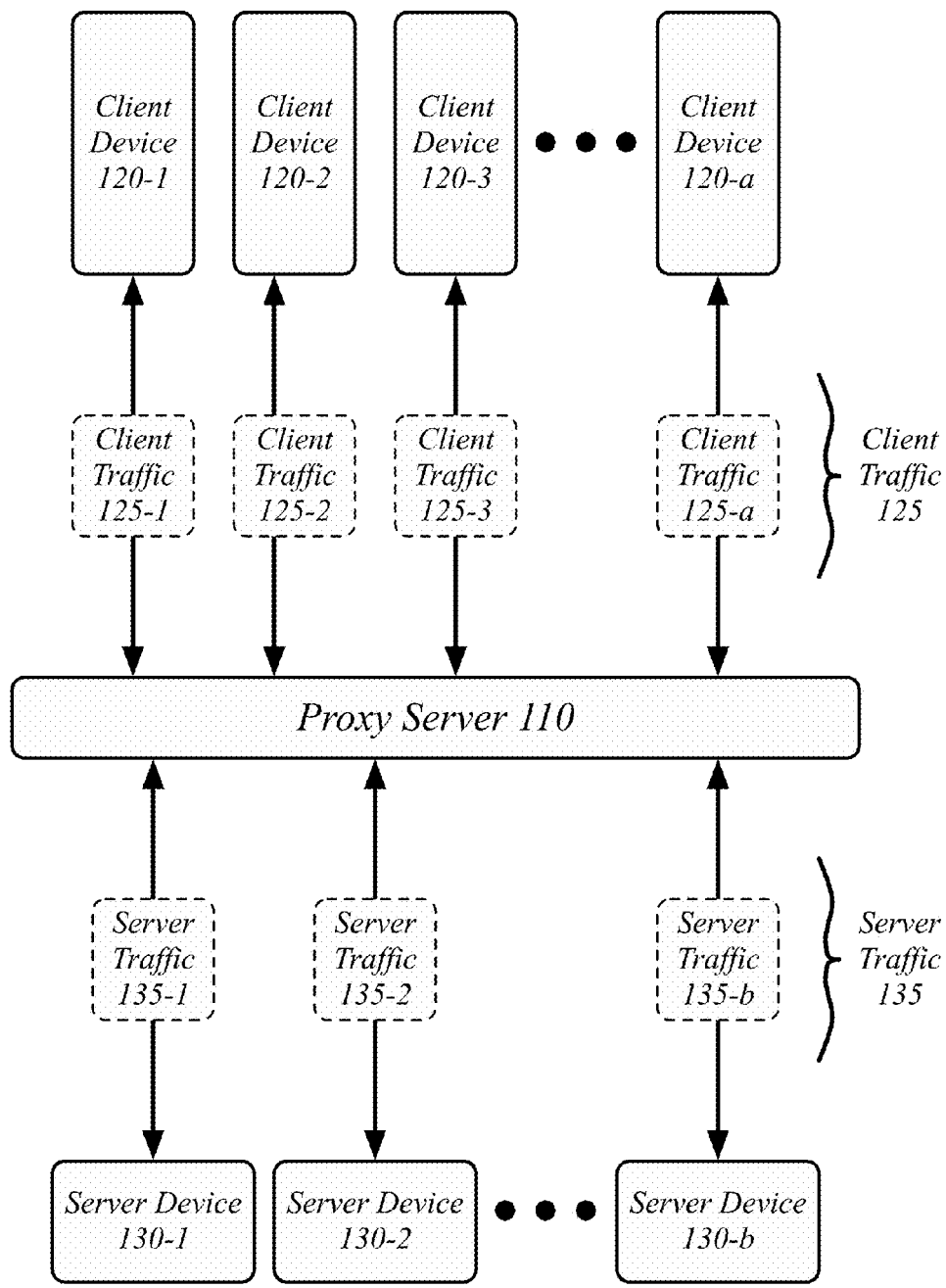
FIG. 1 illustrates an embodiment of a network environment for an activity monitoring system.

Various embodiments are directed to techniques for determining usage statistics for mobile applications based on network traffic that more accurately represent actual application usage by attempting to only represent an application has having been used by a user on a mobile device when network traffic indicates that the application was used in a foreground state. Some mobile applications may generate network traffic when in a background state. Such background network traffic may comprise data caching, message prefetching, state syncing, heartbeats, and other background activities.

Mobile application developers, mobile application distributors, mobile advertisers, cellular operators, mobile device and operating system (OS) providers, and other entities involved in the mobile application ecosystem may be interested in how often users actually use the mobile applications on their devices. Detecting network traffic from a mobile application may be used as a proxy for usage of the application, but this proxy is degraded in utility when background network activity reflects activity by the application but not engagement by the user. As such, distinguishing foreground network activity from background network activity may improve the accuracy of usage statistics for mobile applications.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a network environment for a activity monitoring system 100. As shown in FIG. 1, a proxy server 110 acts as an intermediary in the communication between client devices 120 and server devices 130, receiving and transmitting client traffic 125 and server traffic 135. In one embodiment, the application identification activity monitoring system 100 may comprise a computer-implemented system having multiple components, which may comprise software and/or hardware elements. Although the activity monitoring system 100 shown in FIG. 1 has a limited number of elements in a certain topology, it may be appreciated that the activity monitoring system 100 may include more or less elements in alternate topologies as desired for a given implementation.

A proxy server 110 may be interposed in a network between client devices 120 and server devices 130. Client devices 120 may exchange network traffic with the server devices 130, both sending data to and receiving data from server devices 130. The proxy server 110 may act as an intermediary between the client devices 120 and the server devices 130 for these exchanges. The proxy server 110 may exchange client traffic 125 with the client devices 120 and exchange server traffic 135 with the server devices 130 while acting as an intermediary.

The proxy server may receive client traffic 125-1 from a client device 120-1 and transmit the client traffic 125-1 to server device 130-1 as server traffic 135-1. In some embodiments, server traffic 135-1 may be identical in content to client traffic 125-1, such as a duplication of client traffic 125-1 as received by the proxy server 110 retransmitted to the server device 130-1. In other embodiments, client traffic 125-1 may be modified in the production of server traffic 135-1, such that the server traffic 135-1 transmitted to the server device 130-1 is a modification of the client traffic 125-1 received at the proxy server 110. The client traffic 125-1 may be modified for the production of server traffic 135-1 so as to aid the client device 120-1 and/or server device 130-1 in their communication with each other and in the performance of their respective tasks.

The proxy server may receive server traffic 135-1 from a server device 130-1 and transmit the server traffic 135-1 to client device 120-1 as client traffic 125-1. In some embodiments, client traffic 125-1 may be identical in content to server traffic 135-1, such as a duplication of server traffic 135-1 as received by the proxy server 110 retransmitted to the client device 120-1. In other embodiments, server traffic 135-1 may be modified in the production of client traffic 125-1, such that the client traffic 125-1 transmitted to the client device 120-1 is a modification of the server traffic 135-1 received at the proxy server 110. The server traffic 135-1 may be modified for the production of client traffic 125-1 so as to aid the client device 120-1 and/or server device 130-1 in their communication with each other and in the performance of their respective tasks.

It will be appreciated that a proxy server acting as the intermediary between the client devices 120 and server devices 130 is merely one embodiment of the enclosed techniques. As proxy servers may already be interposed between network actors they may form a particularly convenient device for performing network traffic monitoring. However, any type of intermediary device, including any type of intermediary server, may be used to perform the monitoring and analysis of network traffic between client devices 120 and server devices 130.

The proxy server 110 may monitor the client traffic 125 and server traffic 135 received from the client devices 120 and server devices 130. The proxy server 110 may extract elements of the client traffic 125 and server traffic 135 and log them for analysis. The proxy server 110 may perform analysis on the client traffic 125 and server traffic 135 and on the logged elements of the client traffic 125 and server traffic 135. Alternatively, analysis may be performed by a separate device from the proxy server 110 with the proxy server 110 performing monitoring and logging of extracted elements of the network traffic, transferring the logged information to the separate device for analysis.

Monitoring network traffic, such as client traffic 125 and server traffic 125, may comprise receiving network traffic exchanged via a network interface controller (NIC). A NIC comprises a hardware component connecting a computer device to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network traffic transferred to memory storage may be analyzed, with various elements extracted for use in machine learning and app recognition.

Activity monitoring system 100 may include an authorization server (or other suitable component(s)) that allows users to opt in to or opt out of having their actions logged by activity monitoring system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of proxy server 110 through blocking, data hashing, anonymization, or other suitable techniques as appropriate.

Figure 2:
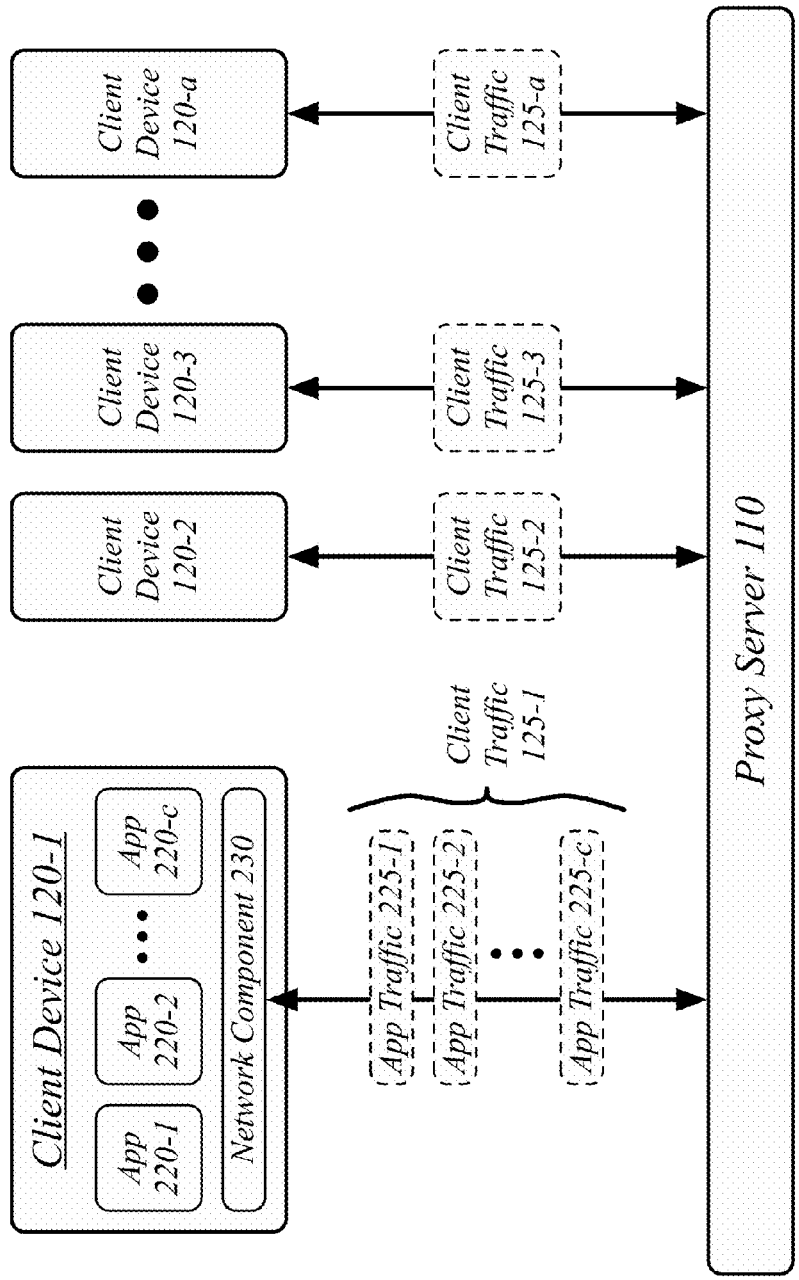
FIG. 2 illustrates an embodiment of a client device running multiple apps that engage in network activity.

FIG. 2 illustrates a block diagram of a particular client device 120-1 running multiple apps 220 that engage in network activity with the proxy server 110. As shown in FIG. 2, the client traffic 125 for the client devices 120 may be generated by one or more apps running on the client devices 120.

The client devices 120 may support and run one or more apps. For instance, client device 120-1 may store and run apps 220, with apps 220 producing and receiving network traffic. Apps 220 may produce and receive network traffic while both foregrounded and backgrounded. Each app may exchange network traffic specific to it, such as app 220-1 exchanging app traffic 225-1, app 220-2 exchanging app traffic 225-2 and so on. App traffic 225 may collectively comprise the client traffic 125-1. Client traffic 125 may be generally comprised of the traffic for various apps running on the client devices 120. Client traffic 125 may also comprise additional traffic not associated with any app, such as network traffic associated with an operating system of the client devices 120.

The app traffic 225 may comprise both foreground app traffic and background app traffic. Foreground app traffic may comprise network traffic generated by an app when the app is in the foreground on a client device. Foreground app traffic may comprise network traffic generated in response to a user's active use of an app. Background app traffic may comprise network traffic generated by an app when the app is in the background on a client device. Background app traffic may comprise network traffic not generated in response to a user's active use of an app. Background app traffic may still include traffic generated in response to a user's actions: for example, background app traffic may include updating a server as to a location of a client device, with the changing location of a device in response to a user's activity, but without that activity being active engagement by the user with the app.

The client devices 120, including client device 120-1, may comprise a network component 230. The network component 230 may be operative to perform network activity on behalf of client device 120-1 including the apps 220, an operating system of client device 120-1, and utilities included with client device 120-1. For instance, client device 120-1 may include a utility for the downloading of apps from an app repository.

An app repository may host a variety of mobile apps for use by various client devices. An app repository may be associated with a provider of a client device, a provider of an operating system of a client device, or be a third-party app repository. Various client devices may be manufactured by different providers. Client devices manufactured by different providers may, in various embodiments, use the same or different app repositories. The same app may be provided by different app repositories, including where an app is provided with differing implementations for different client devices provided by different manufacturers.

The proxy server 110 may receive app traffic 225 from client device 120-1 and use app traffic 225 to identify the apps 220 installed on client device 120-1. As app traffic 225 may collectively comprise client traffic 125-1, some or all of the apps 220 on a client device 120-1 may be identified according to the client traffic 125-1 received by the proxy server 110 from the client device 120-1. The client traffic 125 may generally be used by the proxy server 110 to identify some or all of the apps installed on the client devices 120.

In some cases, various apps on different client devices may exchange traffic with each other via the proxy server 110 rather than exchanging traffic with a server device. It will be appreciated that any of the monitoring, logging, and analysis as described with reference to client devices 120 interacting with server devices 130 may also be applied to the client devices 120 interacting with each other, such as may correspond to peer-to-peer or other forms of client-to-client communication.

Figure 3:
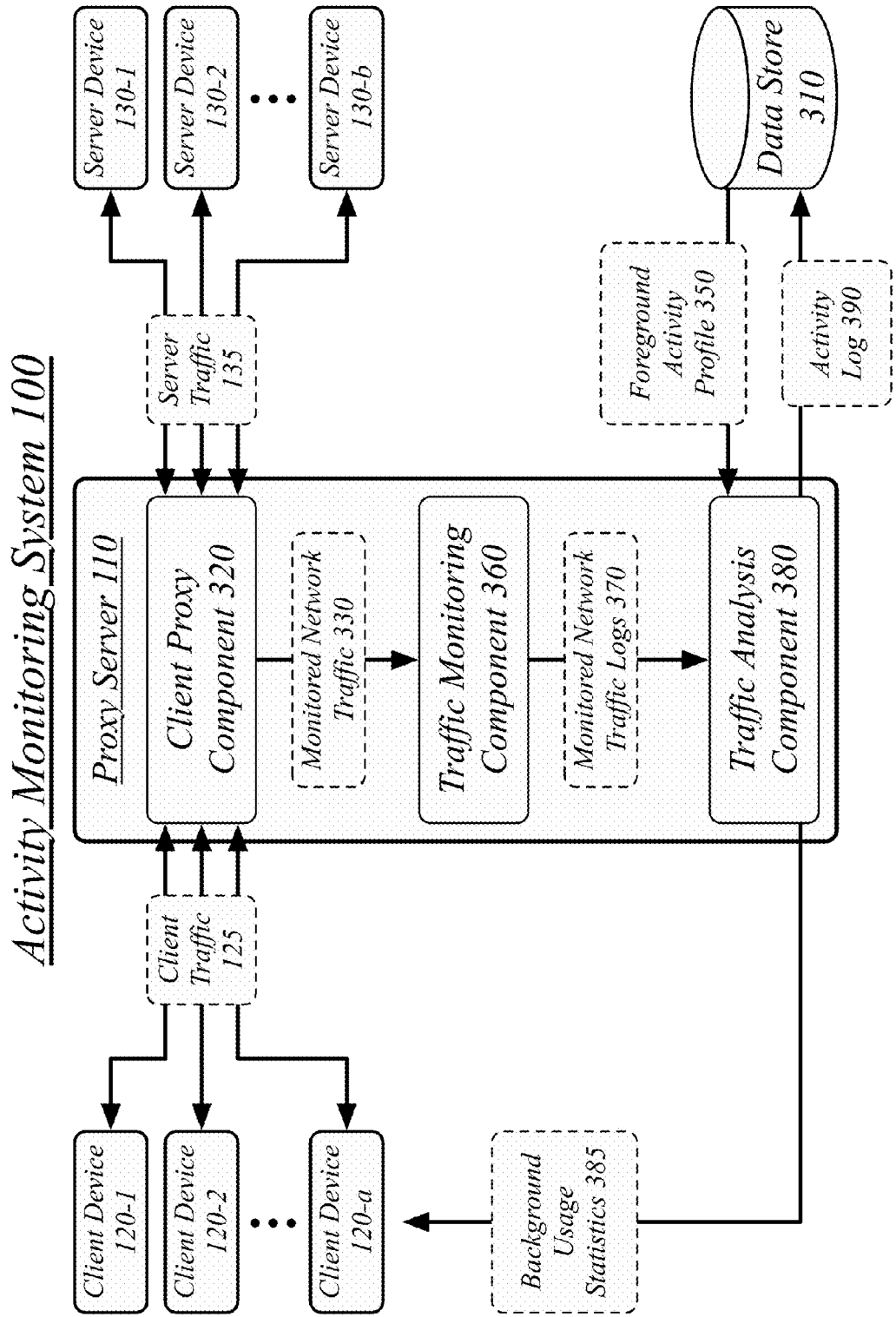
FIG. 3 illustrates the generation of an activity log by the activity monitoring system.

FIG. 3 illustrates the generation of an activity log 390 by the activity monitoring system 100. The activity log 390 may comprise records of one or more mobile apps 220 being actively used by users of client devices 120.

The proxy server 110 may comprise a plurality of components. The proxy server 110 may comprise a client proxy component 320, a traffic monitoring component 360, and a traffic analysis component 380. The proxy server 110 may be generally arranged to monitor network traffic comprising, at least, the client traffic 125 and server traffic 135 to determine active usage statistics for one or more profiled applications.

The client proxy component 320 may perform proxy operations for a plurality of client devices 120, forwarding client traffic 125 to produce server traffic 135 and forwarding server traffic 135 to produce client traffic 125. Client proxy component 230 may provide proxy benefits to the client devices 120 including, without limitation, caching, anonymization, media transcoding, compression, zero-rating, and other benefits of using a proxy server 110. The network traffic handled by the client proxy component 320 may be exposed to the traffic monitoring component 360 to comprise monitored network traffic 330.

The traffic monitoring component 360 may receive monitored network traffic 330 from one or more network interface controllers, the monitored network traffic 330 exchanged with a plurality of client devices 120 over a monitored time period. The monitored network traffic 330 may be originally received at one or more proxy servers 110 for the plurality of client devices 120. As such, monitoring the monitored network traffic 330 may be performed in addition to the other activities of the proxy server 110. The monitoring of the monitored network traffic 330 may be effectively invisible to the users of the client devices 120 except for explicit notification performed in the receipt of permission to perform anonymized monitoring for the generation of anonymous usage statistics, this explicit notification performed as part of notifying the users as to privacy settings of using the proxy server 110.

The traffic monitoring component 360 may generate monitored network traffic logs 370 for use by the traffic analysis component 380. The traffic monitoring component 360 may pass the monitored network traffic logs 370 to the traffic analysis component 380 for use in performing traffic analysis.

The traffic analysis component 380 may receive a foreground activity profile 350, the foreground activity profile 350 comprising one or more signals for distinguishing between foreground activity of one or more profiled applications and background activity of the one or more profiled applications. The foreground activity profile 350 may comprise one or more rules that describe how monitored network traffic 330 should be categorized based on the one or more signals.

The one or more signals may comprise one or more of: a maximum amount of data downloaded over a time window, a maximum amount of data uploaded over a time window, a maximum amount of data downloaded in a single request, a maximum amount of data uploaded in a single request, a maximum response time for a network server to respond to a single request, a maximum duration of an encrypted session, a maximum amount of data downloaded in a single encrypted session, a maximum amount of data uploaded in a single encrypted session, a maximum number of servers connected to over a time window, a maximum number of requests per minute over a time window, a maximum number of time slices in which there was network activity, a probability of a least-probable server accessed, a frequency of requests, time of day, contiguous app usage, contiguous web usage, and requests directed to analytics services. Any or all of these signals may be used in combination with any other signal.

An application uploading or downloading a greater amount data in a time window or single request may imply that the application is being used in a foreground mode, whether encrypted or unencrypted. Similarly, an application performing multiple requests or connecting to multiple servers may imply that the application is being used in a foreground mode. For most applications, foreground mode will result in more significant data usage and more connections being opened. It will be appreciated that some applications, such as an application providing file mirroring through cloud storage, may produce significantly more background traffic than foreground traffic. In some cases, such applications may be hand-coded in the foreground activity profile as having the opposite of the usual activity signals for foreground/background usage.

In some embodiments, a local application on a client device may be able to query an OS of the client device to determine whether other applications are being used in a foreground or background mode. This may be used to profile the foreground and background activity of the applications. The local application, such as by being a local gateway application for the proxy server 110, may detect network traffic from an application, query the OS to determine whether the application is being used in the foreground and background, and learn signals for detecting whether that application is being used in the foreground or background that can be used when querying the OS isn't an option. For instance, some users may not allow such querying. Similarly, some OS's may not allow such querying. An application-specific activity profile generated based on an OS allowing the querying can be used to detect foreground/background activity based on network traffic from the same application executing on a client device with an OS that doesn't allow such querying. This may be particularly valuable in identifying apps, such as a cloud file mirroring application, that may have active usage characteristics that are inverted from most other applications.

An application having a high response time from a server may imply background usage because servers may prioritize responding to foreground requests over responding to background requests. An application having a longer session, however, may imply foreground usage, because many common types of background usage may involve short, infrequent transactions with a server.

The specific server contacted may comprise a signal. An application contacting an analytics service may indicate background usage, or at least not indicate foreground usage, as analytics services may be part of the normal background operation of an application in updating their current status or recent activity. The servers accessed by a particular application may be analyzed, and accessing low-probability servers (e.g., infrequently accessed servers) may indicate that the application is being used in the foreground, as background activity will typically repeatedly hit the same servers for the repeated performance of the same background tasks.

Contiguous usage of other applications or web access may indicate that an application is being used in the foreground. A user actively engaging with their device may switch between applications, request that applications open web pages, and otherwise engage in complex behavior that includes multiple applications engaging in network activity. For example, a user may turn on their device, check their mail, check a messaging problem, check a social-networking application, open web pages linked in the social-networking application, launch a networked game, and otherwise engage the device in performing multiple tasks using multiple applications. In contrast, background activity for any one application may be performed on a schedule (hourly, daily, etc.) that may not particularly coordinate with the background activity of other applications each operating on their own schedule.

In some cases multiple applications may perform contiguous background network activity in response to each of the multiple applications receiving a signal that the device has woken a radio device (e.g., cellular radio, Wi-Fi radio). This may server as a technique by the device to preserve device power due to the reduced power usage of multiple applications all using a radio device than independently waking the radio device for each application. This may result from a minimum wake time for the radio device that exceeds the time required by the applications to perform their background activity. In these cases the proxy server 110 may see contiguous network activity from multiple applications despite the network activity being background activity. In some embodiments the traffic analysis component 380 may be able to identify this as background activity by noticing that, for instance, this network activity corresponds to a specific group of applications all performing small amounts of network traffic in near-unison. Where one or more of the applications are known to use radio-device-wake-up background updates the others may be inferred to also do so based on a synchronicity of their networking activity.

Network activity detected during the day may be considered more likely to be foreground activity than network activity detected at night. As such, the traffic monitoring component 360 may classify network traffic based, at least in part, of a time for the network activity as compared to a day/night cycle for the location of the client device producing the network traffic. However, some users may use their device on an atypical schedule (e.g., late shift employees, night owls). In some embodiments, the traffic analysis component 380 may learn these users based on the atypicality of their network activity and categorize their network activity without reference to time of day or with reference to an altered schedule learned from their behavior.

The traffic analysis component 380 may determine one or more active foreground applications in the monitored network traffic 330 based on the foreground activity profile 350, wherein determining the one or more active foreground applications comprises determining that at least a portion of the monitored network traffic 330 comprises background activity. The traffic analysis component 380 may divide the monitored network traffic 330 into application-specific traffic. The traffic analysis component 380 may divide the application-specific traffic into application-specific foreground traffic and application-specific background traffic. The traffic analysis component 380 may log that a particular application was used by a user when application-specific foreground traffic for that particular application is recognized in the monitored network traffic 330.

The traffic analysis component 380 may log that the one or more active foreground applications were active during the monitored time period. The traffic analysis component 380 may store an activity log 390 in a data store 310 for the activity monitoring system 100. The traffic analysis component 380 may publish the activity log 390 on a network-accessible server. The traffic analysis component 380 may make the activity log 390 available to mobile application developers, mobile application distributors, mobile advertisers, cellular operators, mobile device and operating system (OS) providers, or other entities involved in the mobile application ecosystem that may be interested in how often users actually use the mobile applications on their devices. The traffic analysis component 380 may further generate active usage statistics for the one or more profiled applications based on the logging of the one or more active foreground applications.

The identification of applications being present on client devices and applications producing network traffic on client devices may be used to generate statistics related to the presence and use of applications. For instance, statistics may be generated about the use prevalence, use preferences, and other implications of the foreground activity of applications on client devices. Statistics may be generated about applications usage within a specified time period (e.g., hourly, daily, weekly, monthly), such as the percentage of total users using a particular application within a monitored time period. For example, daily usage patterns may be generated for a plurality of applications based on the one or more applications having been identified as contributing to the network traffic while foregrounded.

Combined statistics may be generated reflecting frequency of active application usage. Once an application-specific traffic pattern is detected, a client application map may be generated, or other record of applications installs generated, based on the identification of application network activity indicating which client devices known to the proxy server 110 have a particular application installed. The network traffic from these client devices with the known installation of the particular app may be considered on a regular basis (e.g., hourly, daily, weekly, monthly) to determine how often that particular application is actively used in the foreground within a particular period of time. This may generate statistics indicating how often a particular application is used by owners of a client device in each hour, day, week, and month.

Related statistics may be generated, such as patterns reflecting how application usage changes at different time periods: whether an application is typically used more or less at a particular time of day, whether an application is typically used more or less at a particular day of the week, etc. These statistics may be generated on a general basis across all users of the application. These statistics may also be generated as specific to particular client devices. For instance, one user may be identified as using a particular application primarily during mid-afternoon with another user identified as using that particular application in the evening. In addition, any known type of pattern may be extracted from the logged data. These patterns may be applied in various ways, such as for match-making multi-player games based the time of day in which a user is most active in a game application, targeting ads based on similarities in application usage patterns, and according to any other known technique for targeting users based on identified patterns.

The traffic analysis component 360 may generate background usage statistics 385 for the one or more profiled applications for a subject client device of the plurality of client devices 120, the background usage statistics generated based on the logging of the one or more active foreground applications and the received monitored network traffic 330 for the subject client device. The traffic analysis component 360 may transmit the background usage statistics 385 to the subject client device. The background usage statistics 385 may comprise, without limitation, an indication of how much background network activity—expressed, for example, in a quantity of data such as KB, MB, or GB—each identified application performed over a time period. The background usage statistics 385 may indicate how much of this background network activity was performed on a cellular data network. The user of a client device may benefit from knowing how much of their cellular data subscription or prepaid cellular data allocation was absorbed by the background activity of their applications. This may empower the user of the subject client device to determine whether they want to uninstall or deactivate background network activity for one or more of their applications that, for example, may use more background network traffic than is warranted by the utility to the user of the application.

Figure 4:
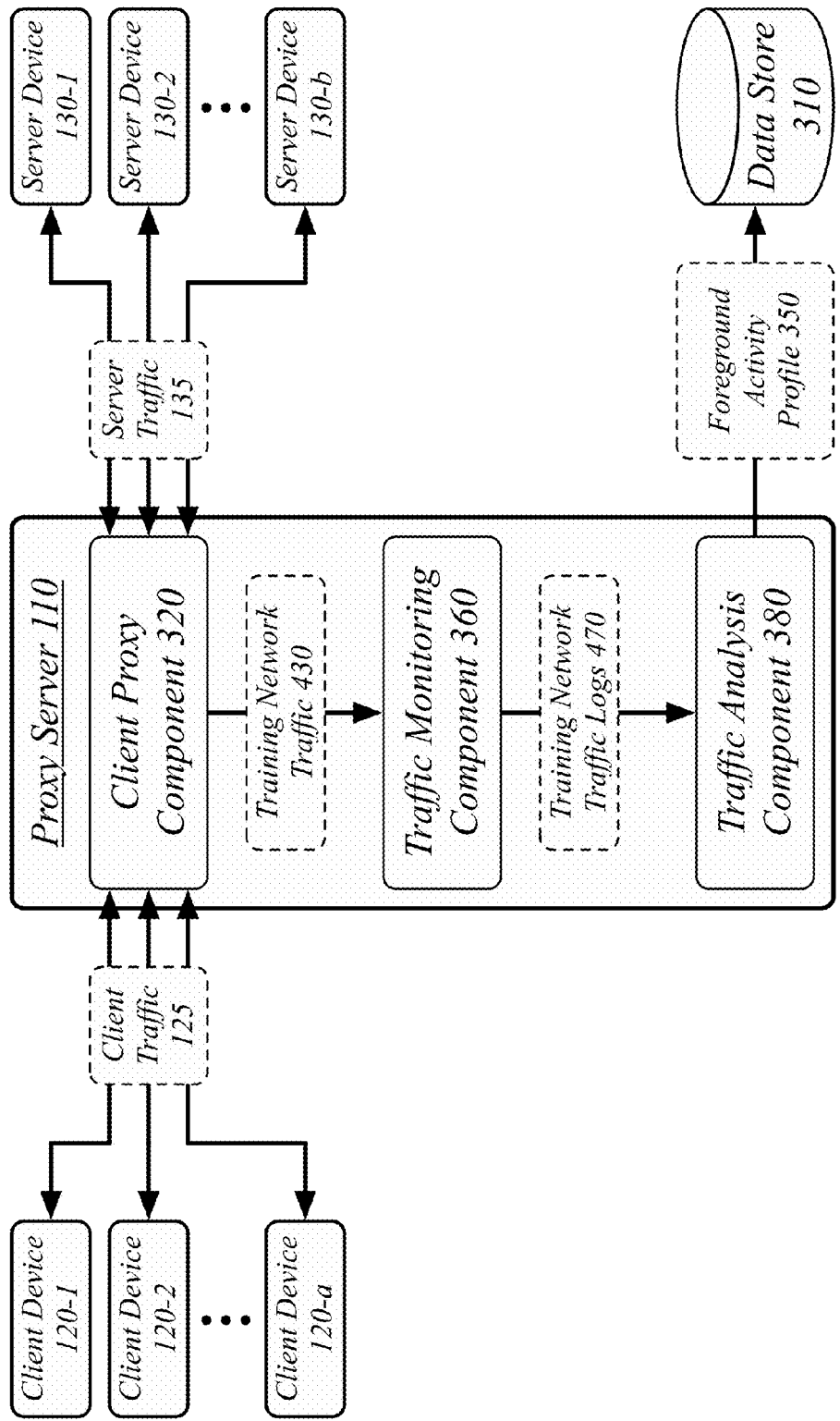
FIG. 4 illustrates the generation of a foreground activity profile by the activity monitoring system.

FIG. 4 illustrates the generation of a foreground activity profile 350 by the activity monitoring system 100. The foreground activity profile 350 may comprise one or more rules that describe how monitored network traffic 330 should be categorized based on one or more signals.

The traffic monitoring component 360 may receive training network traffic 430 from the client proxy component 320. The training network traffic 430 may be gathered and received according to the same techniques for gathering and receiving the monitored network traffic 330. The training network traffic 430 may be divided into first training network traffic and second training network traffic, wherein one of the first and second training network traffic corresponds to a subset of the training network traffic 430 with a higher predominance of background activity and the other corresponds to a subset of the training network traffic 430 with a lower predominance of background activity. This division may be performed according to a variety of techniques and may based on a variety of signals.

The division between the first and second training network traffic may be based on a time of day during which the training network traffic 340 was received. Training network traffic 340 received during the day may be inferred to have a higher predominance of foreground network activity and training network traffic 340 received during the night may be inferred to have a higher predominance of background network activity. In some embodiments, training network traffic 340 from transition periods (e.g., late evening and early morning) may be excluded in order to base the machine learning on time periods with clearly expressed dominant forms of traffic.

The training monitoring component 360 may receive first training network traffic from one or more network interface controllers, the first network traffic exchanged with a plurality of training client devices 120 over a first time period and receive second training network traffic from the one or more network interface controllers, the second network traffic exchanged with the plurality of training client devices 120 over a second time period, the second time period associated with a higher predominance of background activity than the first time period. The first time period may comprise one or more daytime periods. The second time period may comprise one or more nighttime periods. For instance, the training network traffic 430 may be collected over a plurality of days, with the traffic for each of the days divided into nighttime traffic and daytime traffic.

The traffic monitoring component 360 may generate training network traffic logs 470 for use by the traffic analysis component 380. The traffic monitoring component 360 may pass the training network traffic logs 470 to the traffic analysis component 380 for use in learning the foreground/background network traffic signals. The training network traffic logs 470 may comprise indications of the various signals used by the traffic analysis component 380, with the traffic analysis component 380 using machine learning to learn which signals correspond to foreground network activity and which signals correspond to background network activity. The traffic analysis component 380 may therefore generate the foreground activity profile 350 using machine learning based on the first training network traffic and the second training network traffic.

In some embodiments, the traffic analysis component 380 may receive a network profile map, the network profile map comprising application-specific traffic patterns defining relationships between a plurality of applications and network traffic produced by the plurality of applications. The traffic analysis component 380 may determine one or more active applications in the first training network traffic and second training network traffic based on the network profile map. The traffic analysis component 380 may generate the foreground activity profile 350 using machine learning based on the first training network traffic, the second training network traffic, and the determination of the one or more active applications. As such, the foreground activity profile 350 may comprise one or more application-specific signals for distinguishing between the foreground activity of the one or more profiled applications and the background activity of the one or more profiled applications, wherein identifying the application associated with particular foreground activity patterns is based on the network profile map. However, the foreground activity profile 350 may alternatively or additional comprise one or more non-application-specific signals for distinguishing between the foreground activity of the one or more profiled applications and the background activity of the one or more profiled applications. The non-application-specific signals may be determined based on the general patterns of the training network traffic 430 without individually analyzing the behavior of specific applications.

Figure 5:
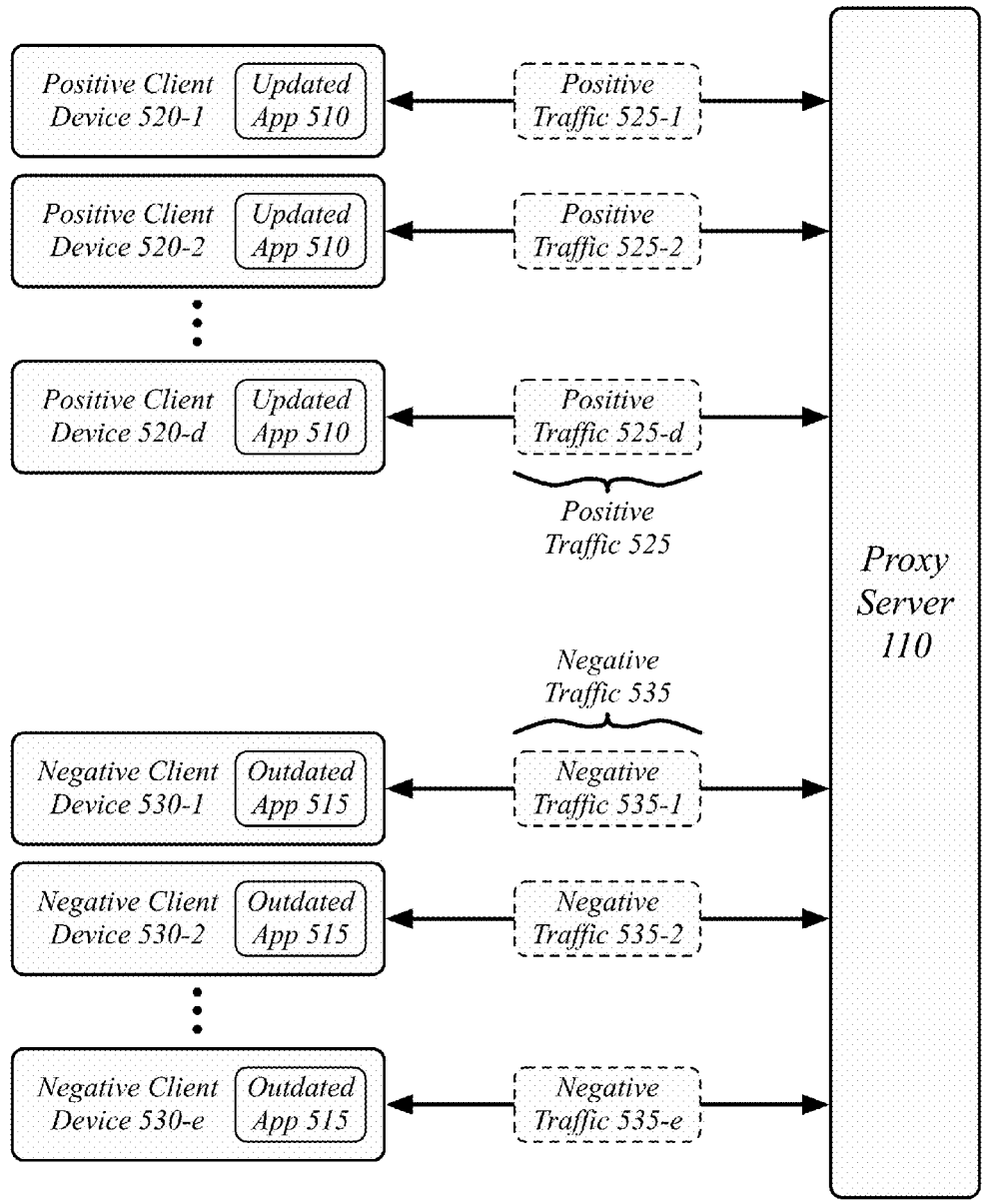
FIG. 5 illustrates the division between client traffic into a positive training set and negative training set.

FIG. 5 illustrates the division between client traffic into a positive training set and negative training set. As shown in FIG. 5, positive traffic 525 from positive client devices 520 with an updated app 510 installed is distinguished from negative traffic 535 from negative client devices 530 with an outdated app 515 installed. The outdated app 515 may comprise an older version of the updated app 510. In some cases, an outdated version of an app may not perform background activity performed by the updated version, with the update including the addition of background activity. As such, the background activity of an updated app 510 may be profiled based on the changes to training network traffic 430 for that app that differ between clients with the update and clients without the update.

Positive client devices 520 may correspond to those client devices for which it has been determined that an updated app 510 has been installed at some point in the past. In some cases, the positive client devices 520 may correspond to those for which it has been specifically determined that the updated app 510 is still installed (e.g., has not been uninstalled or otherwise removed). For instance, the proxy server 110 may be operative to query client devices to confirm the presence of the updated app 510, such as by querying the operating systems of the client devices or a local app on the client devices. While client devices may not expose an interface—either externally over the network or internally to a local app—for retrieving a list of installed apps, client devices may support querying as to whether a particular app is installed and which version. As such, the proxy server 110 may determine a list of client devices on which the updated app 510 is suspected to reside—for instance, because a download of the updated app 510 by the client devices was detected—and confirm its continued presence prior to assigning the client devices to the set of positive client devices 520 and monitoring the positive traffic 525 from the positive client devices 520 for analysis.

Negative client devices 530 may correspond to those client devices for which it has not been determined that an updated app 510 has been installed and that an outdated app 515 persists, the outdated app 515 the outdated version of the updated app 510. The proxy server 110 may have determined that none of the indications it uses to detect the presence or installation of an updated to an app are present in the activities it has monitored. In some cases, the negative client devices 530 may correspond to those for which it has been specifically determined that the outdate app 515 was installed and the updated app 510 has not been installed to replace it. For instance, the proxy server 110 may be operative to query client devices to confirm the absence of the updated app 510 and the presence of the outdated app 515, such as by querying the operating systems of the client devices or a local app on the client devices. The proxy server 110 may determine a list of client devices on which the updated app 510 is suspected to not reside—for instance, because a download of the updated app 510 by the client devices was not detected—and confirm its absence prior to assigning the client devices to the set of negative client devices 530 and monitoring the positive traffic 535 from the negative client devices 530 for analysis.

Applications may be analyzed according to the application file (e.g., application archive file) used to store an application in a repository, transfer the application from an application repository to a client device, store the application on a device prior to installation, and generally to contain an uninstalled application. The proxy server 110 may be operative to determine that an updated app 510 has been installed by detecting a transfer of the application file for the updated app 510 through the proxy server 110. The proxy server 110 may retain a copy of the detected application file for analysis and/or may request application files from an application repository for analysis.

An application file may be analyzed by the activity monitoring system 100 to determine whether it may produce background traffic. For instance, the operating system for a client device may have one or more APIs for performing background activity. The activity monitoring system 100 may analyze an application file to determine whether any background API of a plurality of background APIs are referenced in the application file or requested for use by the application stored in the application file. If a background API is referenced or requested, the application, or the specific version of the application, may be marked as potentially producing background traffic. If no background API of the plurality of background APIs is referenced or requested the application, or the specific version of the application, may be marked as not producing background traffic and that, therefore, all network traffic produced by the application is foreground traffic. Applications that use background APIs may be used as positive examples for the learning general cross-application patterns for background traffic while applications that do not use background APIs may be used as negative examples. A new version of an application that adds the use of background traffic may be identified by determining that the new version adds the use of background APIs.

A lack of the positive indications used to detect the presence or installation of the updated app 510 may not identically correspond to the updated app 510 not being present on a client device or having not been installed on a client device. For example, the updated app 510 may have been installed prior to the period during which the proxy server 110 is monitoring a client device for app downloads. The updated app 510 may have been downloaded during a period of monitoring but downloaded using a channel (e.g., Wi-Fi) that the proxy server 110 doesn't monitor, such as where the proxy server 110 primarily or only assists with cellular traffic. Similarly, the detection of positive indications of the presence or installation of the updated app 510 may not identically correspond to the presence of the updated app 510 on a client device, particularly during the period in which the network traffic for a client device is monitored. As such, the set of positive client devices 520 and the set of negative client devices 530—and therefore the positive traffic 525 and negative traffic 535—may not perfectly correspond to devices and traffic comprising the sort of data desired for analysis. Further, an updated app 510 may be installed on a client device but not be active, and as such not contribute to the network traffic for the client device.

Therefore, the machine learning applied to the logged elements of the positive traffic 525 and the logged elements of the negative traffic 535 may be configured to accommodate inexactness in the sorting of the traffic into positive and negative examples. The machine learning techniques may look for traffic patterns that are more prominent in the positive traffic 525 than they are in the negative traffic 535 rather than those that are present in the positive traffic 525 and absent in the negative traffic 535 as the presence of a specific traffic pattern in the negative traffic 535 may not determinatively correspond to the traffic pattern not being associated with the updated app 510 being considered. Similarly, the traffic pattern not being present in the network traffic for a particular client device in the set of positive client devices 520 does not necessarily indicate that the traffic pattern is not associated with the updated app 510 but may merely indicate that the updated app 510 was not performing network activity—or even not performing the particular sort of network activity responsible for the traffic pattern from among a plurality of network activities performed by the updated app 510—during the period in which monitoring occurred. A variety of machine learning techniques may be used in various embodiments: decision tree learning, linear classification, Bayesian analysis, or any other known technique. In some embodiments a single technique may be selected and in others a plurality of techniques may be used with the most reliable classification scheme produced by any of the plurality of techniques being used for the identification of background network traffic for the updated app 510.

The traffic analysis component 380 may divide the received training network traffic 430, into a positive training set and a negative training set based on a client application map. The positive training set may correspond to the positive traffic 525 exchanged with the positive client devices 520 and the negative training set may correspond to the negative traffic 535 exchanged with the negative client devices 530.

The traffic analysis component 380 may assign network traffic of the training network traffic 430 assigned to the positive training set when it is received from client devices that the client application map indicates have the updated app 510. The traffic analysis component 380 may assign network traffic of the training network traffic to the negative training set when it is received from client devices that the client application map indicates have the outdated app 515 installed. The traffic analysis component 380 may determine an app-specific foreground activity pattern for the particular app by detecting consistent differences between the positive training set and the negative training set and add the app-specific foreground activity pattern to the foreground activity profile 350 as being associated with the particular app.

As such, the traffic analysis component 380 may receive first training network traffic from one or more network interface controllers, the first network traffic exchanged with a plurality of updated training client devices. The traffic analysis component 380 may receive second training network traffic from the one or more network interface controllers, the second network traffic exchanged with a plurality of non-updated training client devices, wherein the non-updated training client devices execute a version of an application that does not perform background activity. The traffic analysis component 380 may then generate the foreground activity profile 350 using machine learning based on the first training network traffic and the second training network traffic.

In some cases, client devices with foreground traffic and client devices with background traffic may be identified by directly controlling the client devices, including directly controlling whether applications are foregrounded or backgrounded. One or more automated software programs and/or one or more human operators may control and log what application, if any, is foregrounded on a plurality of client devices. The traffic from the plurality of client devices may be monitored by the traffic monitoring component 360 with the traffic classified for learning as foreground traffic or background traffic based on the control and logging of foreground and background activity by the automated software programs and/or human operators.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive monitored network traffic 330 from one or more network interface controllers, the monitored network traffic 330 exchanged with a plurality of client devices 120 over a monitored time period at block 602.

The logic flow 600 may receive a foreground activity profile 350, the foreground activity profile 350 comprising one or more signals for distinguishing between foreground activity of one or more profiled applications and background activity of the one or more profiled applications at block 604.

The logic flow 600 may determine one or more active foreground applications in the monitored network traffic 330 based on the foreground activity profile 350, wherein determining the one or more active foreground applications comprises determining that at least a portion of the monitored network traffic 330 comprises background activity at block 606.

The logic flow 600 may log that the one or more active foreground applications were active during the monitored time period at block 608.

The embodiments are not limited to this example.

Figure 7:
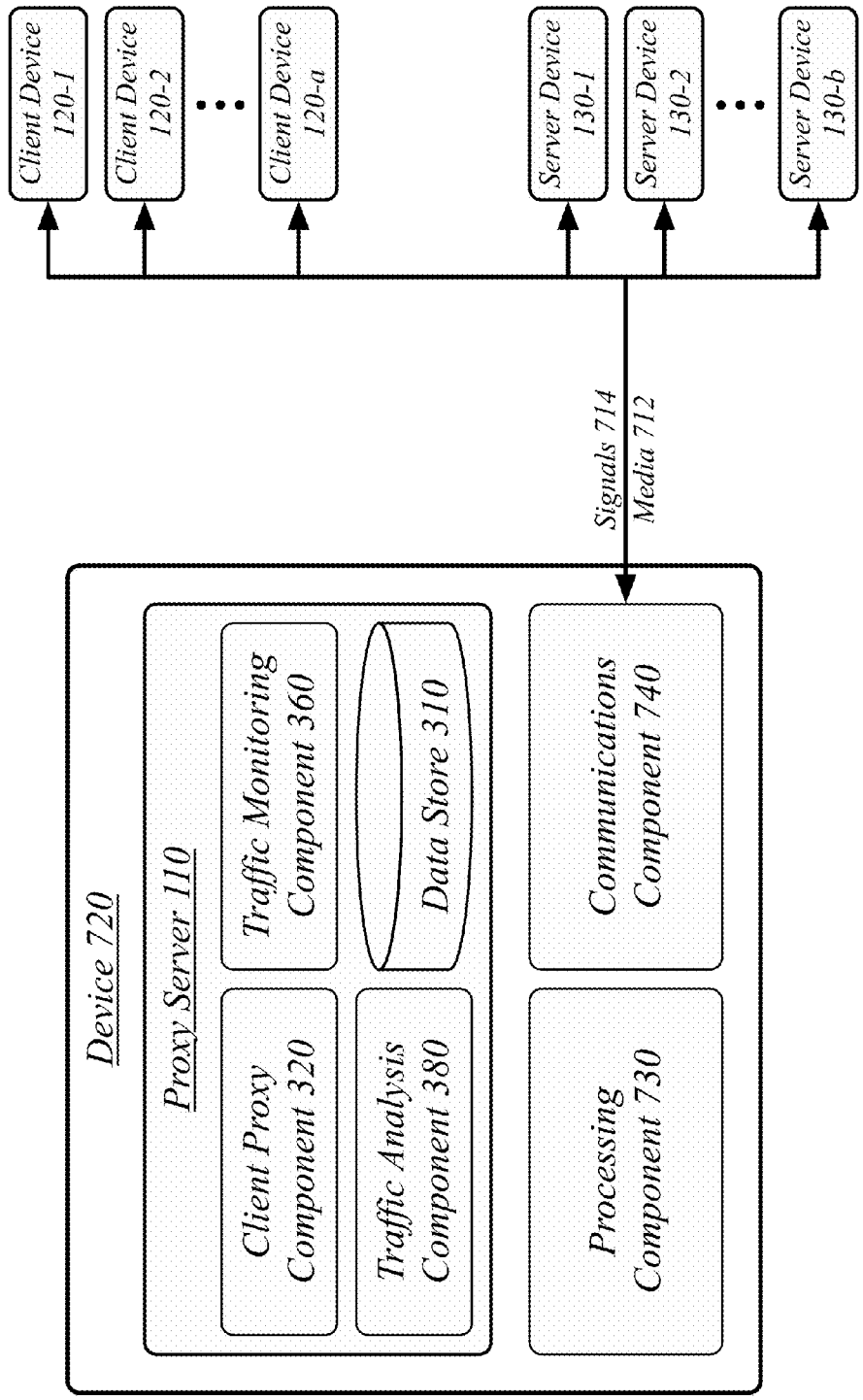
FIG. 7 illustrates an embodiment of a centralized system for the system of FIG. 1.

FIG. 7 illustrates a block diagram of a centralized system 700. The centralized system 700 may implement some or all of the structure and/or operations for the activity monitoring system 100 in a single computing entity, such as entirely within a single device 720.

The device 720 may comprise any electronic device capable of receiving, processing, and sending information for the activity monitoring system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the activity monitoring system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the activity monitoring system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with client devices 120 and server devices 130 over a communications media 712 using communications signals 714 via the communications component 740. The device 720 may execute the proxy server 110 including the client proxy component 320, traffic monitoring 360, traffic analysis component 380, and data store 310.

Figure 8:
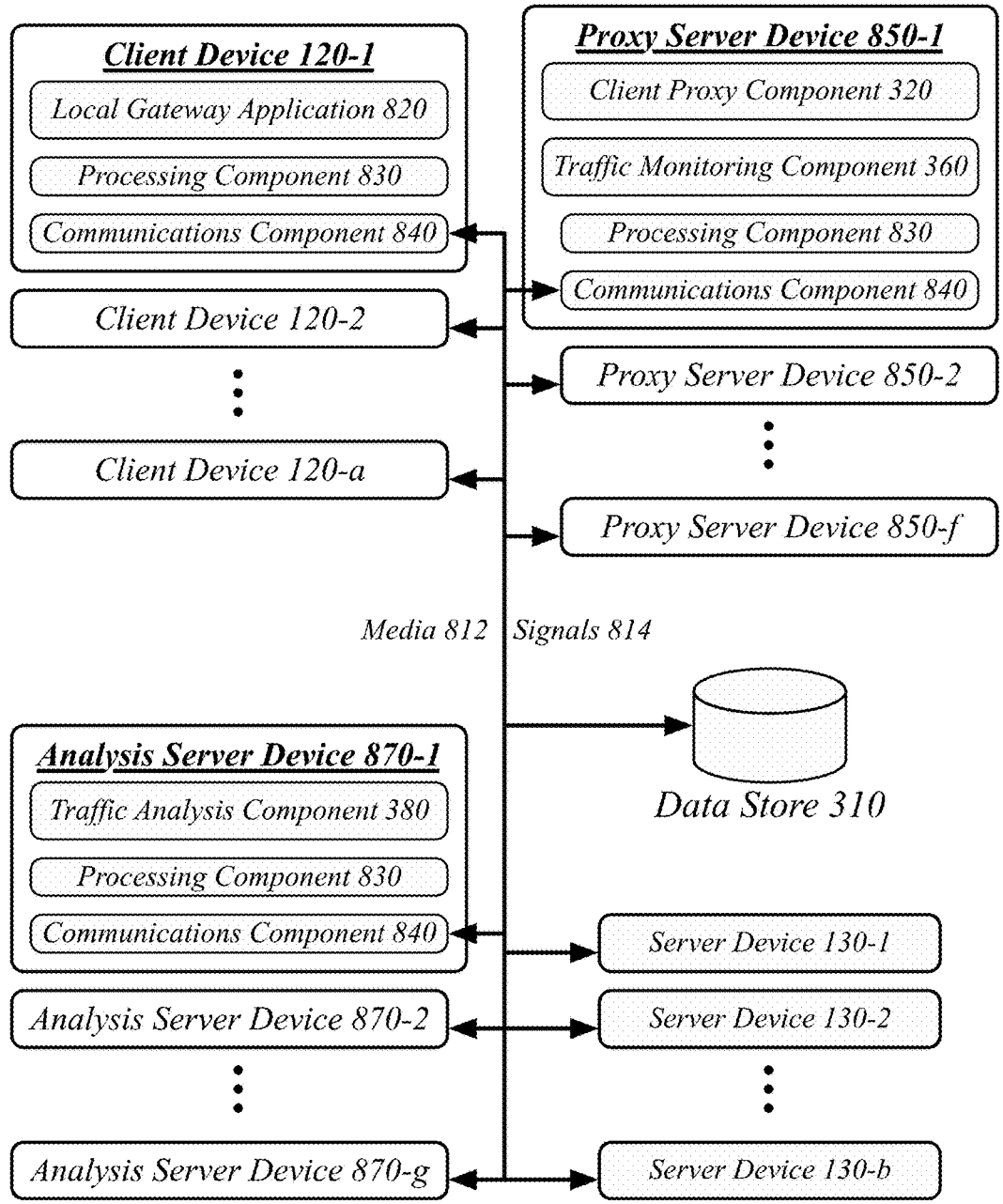
FIG. 8 illustrates an embodiment of a distributed system for the system of FIG. 1.

FIG. 8 illustrates a block diagram of a distributed system 800. The distributed system 800 may distribute portions of the structure and/or operations for the activity monitoring system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise an analysis server device 870 and a proxy server device 850. In general, the server devices 850, 870 may be the same or similar to the device 720 as described with reference to FIG. 7. For instance, the server devices 850, 870 may each comprise a processing component 830 and a communications component 840 which are the same or similar to the processing component 730 and the communications component 740, respectively, as described with reference to FIG. 7. In another example, the devices 850, 870 may communicate over a communications media 812 using communications signals 814 via the communications components 840.

The proxy server device 850 may comprise or employ one or more client programs that operate to perform various methodologies in accordance with the described embodiments. In one embodiment, for example, the proxy server device 850 may implement the client proxy component 320 and traffic monitoring component 360. The analysis server device 870 may comprise or employ one or more server programs that operate to perform various methodologies in accordance with the described embodiments. In one embodiment, for example, the analysis server device 870 may implement the traffic analysis component 380. The signals 814 transmitted over media 812 may comprise communication between the server devices 850, 870, communication with a distributed data store 310, communication with the client devices 120, and/or communication with the server devices 130.

Figure 9:
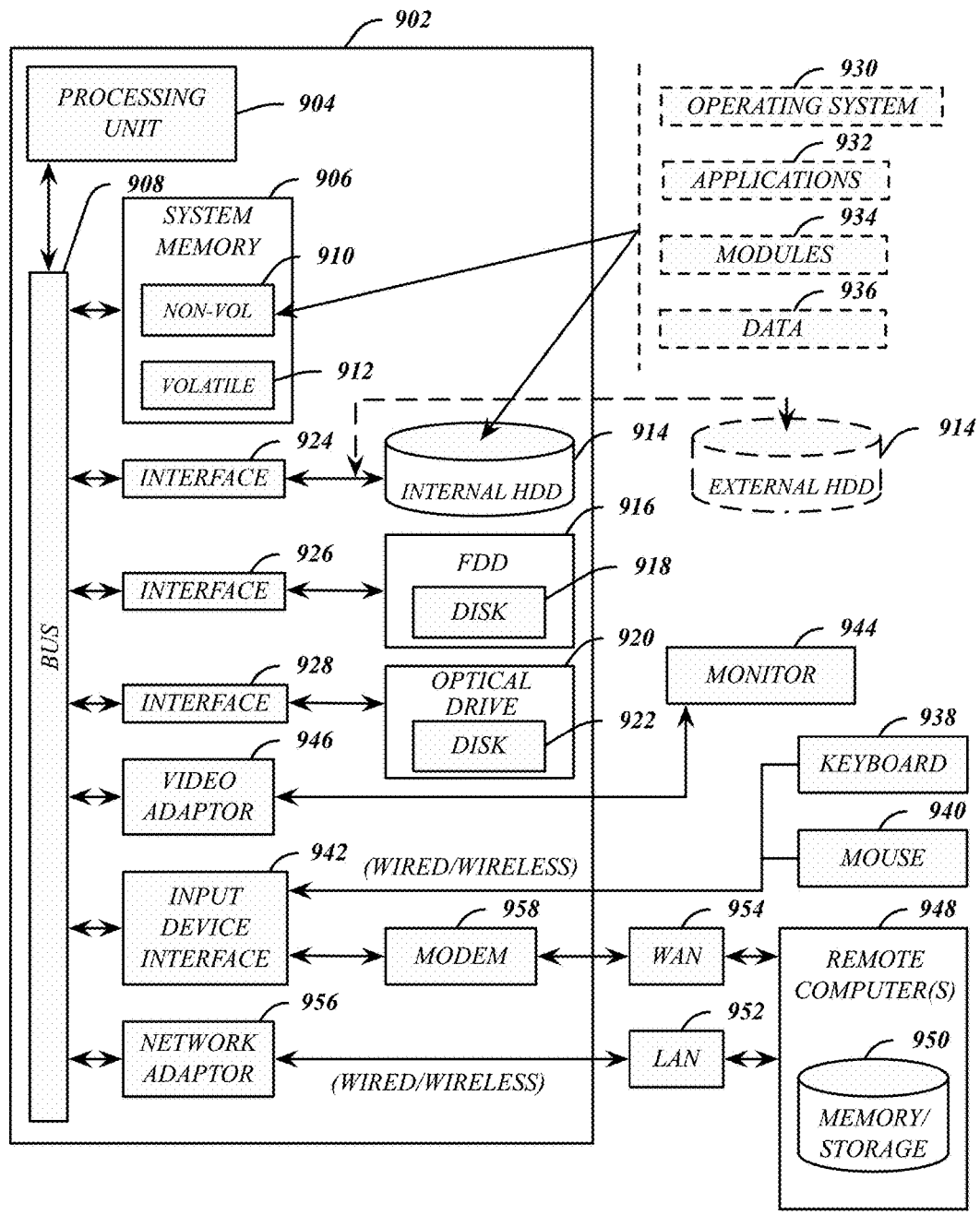
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7 and FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the activity monitoring system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
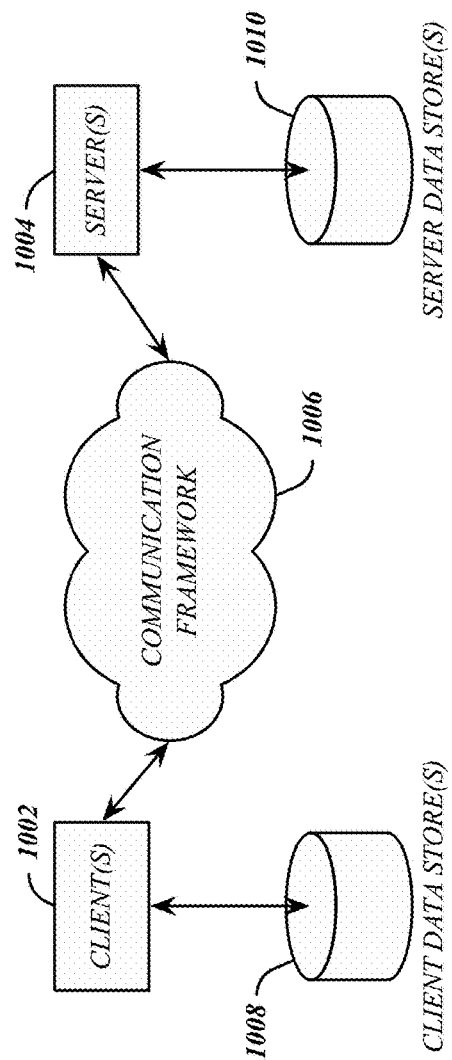
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client devices 120. The servers 1004 may implement the server devices 850, 870. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
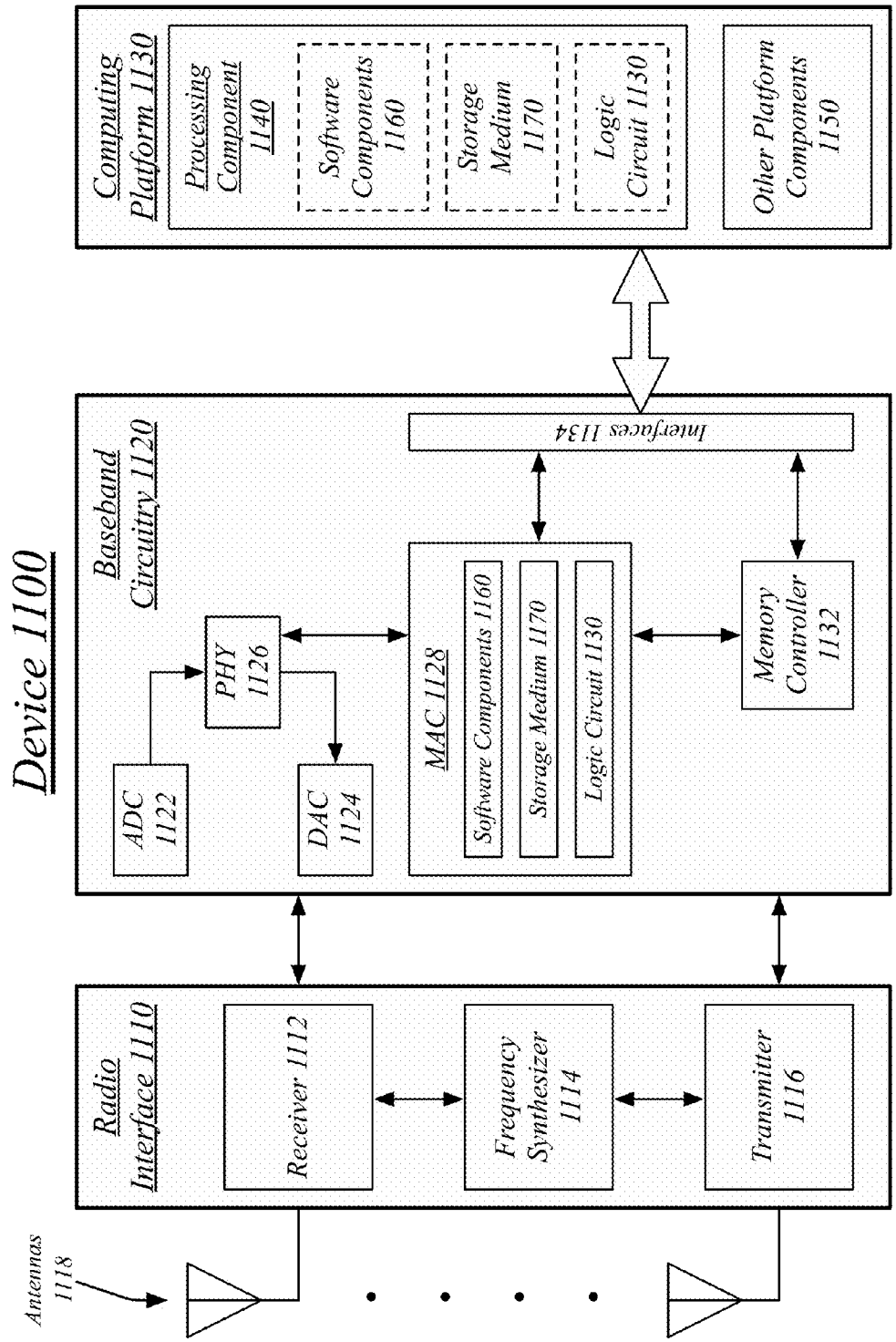
FIG. 11 illustrates an embodiment of a radio device architecture.

FIG. 11 illustrates an embodiment of a device 1100 for use in a multicarrier OFDM system, such as the activity monitoring system 100. Device 1100 may implement, for example, software components 1160 as described with reference to activity monitoring system 100 and/or a logic circuit 1130. The logic circuit 1130 may include physical circuits to perform operations described for the activity monitoring system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the activity monitoring system 100 and/or logic circuit 1130 in a single computing entity, such as entirely within a single device. Alternatively, the device 1100 may distribute portions of the structure and/or operations for the activity monitoring system 100 and/or logic circuit 1130 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the activity monitoring system 100 and logic circuit 1130 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving monitored network traffic from one or more network interface controllers, the monitored network traffic exchanged with a plurality of client devices over a monitored time period; receiving a foreground activity profile, the foreground activity profile comprising one or more signals for distinguishing between foreground activity of one or more profiled applications and background activity of the one or more profiled applications; determining one or more active foreground applications in the monitored network traffic based on the foreground activity profile, wherein determining the one or more active foreground applications comprises determining that at least a portion of the monitored network traffic comprises background activity; and logging that the one or more active foreground applications were active during the monitored time period.

A computer-implemented method may further comprise generating active usage statistics for the one or more profiled applications based on the logging of the one or more active foreground applications.

A computer-implemented method may further comprise generating background usage statistics for the one or more profiled applications for a subject client device of the plurality of client devices, the background usage statistics generated based on the logging of the one or more active foreground applications and the received monitored network traffic for the subject client device; and transmitting the background usage statistics to the subject client device.

A computer-implemented method may further comprise the monitored network traffic received at one or more proxy servers for the plurality of client devices.

A computer-implemented method may further comprise the signals comprising one or more of: a maximum amount of data downloaded over a time window, a maximum amount of data uploaded over a time window, a maximum amount of data downloaded in a single request, a maximum amount of data uploaded in a single request, a maximum response time for a network server to respond to a single request, a maximum duration of an encrypted session, a maximum amount of data downloaded in a single encrypted session, a maximum amount of data uploaded in a single encrypted session, a maximum number of servers connected to over a time window, a maximum number of requests per minute over a time window, a maximum number of time slices in which there was network activity, a probability of a least-probable server accessed, a frequency of requests, time of day, contiguous app usage, contiguous web usage, and requests directed to analytics services.

A computer-implemented method may further comprise receiving first training network traffic from one or more network interface controllers, the first network traffic exchanged with a plurality of training client devices over a first time period; receiving second training network traffic from the one or more network interface controllers, the second network traffic exchanged with the plurality of training client devices over a second time period, the second time period associated with a higher predominance of background activity than the first time period; and generating the foreground activity profile using machine learning based on the first training network traffic and the second training network traffic.

A computer-implemented method may further comprise the first time period comprising one or more daytime periods and the second time period comprising one or more nighttime periods.

A computer-implemented method may further comprise the foreground activity profile comprising one or more non-application-specific signals for distinguishing between the foreground activity of the one or more profiled applications and the background activity of the one or more profiled applications.

A computer-implemented method may further comprise the foreground activity profile comprising one or more application-specific signals for distinguishing between the foreground activity of the one or more profiled applications and the background activity of the one or more profiled applications.

A computer-implemented method may further comprise receiving first training network traffic from one or more network interface controllers, the first network traffic exchanged with a plurality of updated training client devices; receiving second training network traffic from the one or more network interface controllers, the second network traffic exchanged with a plurality of non-updated training client devices, wherein the non-updated training client devices execute a version of an application that does not perform background activity; and generating the foreground activity profile using machine learning based on the first training network traffic and the second training network traffic.

An apparatus may comprise a processor circuit on a device; a traffic monitoring component operative on the processor circuit to receive monitored network traffic from one or more network interface controllers at a proxy server for a plurality of client devices, the monitored network traffic exchanged with the plurality of client devices over a monitored time period; and a traffic analysis component operative on the processor circuit to receive a foreground activity profile, the foreground activity profile comprising one or more signals for distinguishing between foreground activity of one or more profiled applications and background activity of the one or more profiled applications; determine one or more active foreground applications in the monitored network traffic based on the foreground activity profile, wherein determining the one or more active foreground applications comprises determining that at least a portion of the monitored network traffic comprises background activity; log that the one or more active foreground applications were active during the monitored time period; and generate active usage statistics for the one or more profiled applications based on the logging of the one or more active foreground applications. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving monitored network traffic from one or more network interface controllers, the monitored network traffic exchanged with a plurality of client devices over a monitored time period;
receiving a foreground activity profile, the foreground activity profile comprising one or more signals for distinguishing between foreground activity indicative of a foreground state of one or more profiled applications and background activity indicative of a background state of the one or more profiled applications, wherein the foreground activity profile is generated using machine learning based on training data generated from network traffic from a plurality of training client devices;
determining one or more active foreground applications in the monitored network traffic based on the foreground activity profile, wherein determining the one or more active foreground applications comprises determining that at least a portion of the monitored network traffic comprises background activity; and logging that the one or more active foreground applications were active during the monitored time period.

2. The method of claim 1, comprising:
generating active usage statistics for the one or more profiled applications based on the logging of the one or more active foreground applications.

3. The method of claim 1, comprising:
generating background usage statistics for the one or more profiled applications for a subject client device of the plurality of client devices, the background usage statistics generated based on the logging of the one or more active foreground applications and the received monitored network traffic for the subject client device; and
transmitting the background usage statistics to the subject client device.

4. The method of claim 1, the monitored network traffic received at one or more proxy servers for the plurality of client devices.

5. The method of claim 1, the signals comprising one or more of: a maximum amount of data downloaded over a time window, a maximum amount of data uploaded over a time window, a maximum amount of data downloaded in a single request, a maximum amount of data uploaded in a single request, a maximum response time for a network server to respond to a single request, a maximum duration of an encrypted session, a maximum amount of data downloaded in a single encrypted session, a maximum amount of data uploaded in a single encrypted session, a maximum number of servers connected to over a time window, a maximum number of requests per minute over a time window, a maximum number of time slices in which there was network activity, a probability of a least-probable server accessed, a frequency of requests, time of day, contiguous app usage, contiguous web usage, and requests directed to analytics services.

6. The method of claim 1, wherein the network traffic from a plurality of training client devices includes:
first training network traffic received from one or more network interface controllers, the first network traffic exchanged with a plurality of training client devices over a first time period; and
second training network traffic received from the one or more network interface controllers, the second network traffic exchanged with the plurality of training client devices over a second time period, the second time period associated with a higher predominance of background activity than the first time period.

7. The method of claim 6, the first time period comprising one or more daytime periods and the second time period comprising one or more nighttime periods.

8. The method of claim 1, the foreground activity profile comprising one or more non-application-specific signals for distinguishing between the foreground activity of the one or more profiled applications and the background activity of the one or more profiled applications.

9. The method of claim 1, the foreground activity profile comprising one or more application-specific signals for distinguishing between the foreground activity of the one or more profiled applications and the background activity of the one or more profiled applications.

10. The method of claim 1, wherein the network traffic from a plurality of training client devices includes:
first training network traffic received from one or more network interface controllers, the first network traffic exchanged with a plurality of updated training client devices; and
second training network traffic received from the one or more network interface controllers, the second network traffic exchanged with a plurality of non-updated training client devices, wherein the non-updated training client devices execute a version of an application that does not perform background activity.

11. An apparatus, comprising:
a processor circuit on a device;
a traffic monitoring component operative on the processor circuit to receive monitored network traffic from one or more network interface controllers at a proxy server for a plurality of client devices, the monitored network traffic exchanged with the plurality of client devices over a monitored time period; and
a traffic analysis component operative on the processor circuit to receive a foreground activity profile, the foreground activity profile comprising one or more signals for distinguishing between foreground activity indicative of a foreground state of one or more profiled applications and background activity indicative of a background state of the one or more profiled applications; determine one or more active foreground applications in the monitored network traffic based on the foreground activity profile, wherein determining the one or more active foreground applications comprises determining that at least a portion of the monitored network traffic comprises background activity; log that the one or more active foreground applications were active during the monitored time period; and generate active usage statistics for the one or more profiled applications based on the logging of the one or more active foreground applications;
wherein the foreground activity profile is generated using machine learning based on training data generated from network traffic from a plurality of training devices.

12. The apparatus of claim 11, the signals comprising one or more of: a maximum amount of data downloaded over a time window, a maximum amount of data uploaded over a time window, a maximum amount of data downloaded in a single request, a maximum amount of data uploaded in a single request, a maximum response time for a network server to respond to a single request, a maximum duration of an encrypted session, a maximum amount of data downloaded in a single encrypted session, a maximum amount of data uploaded in a single encrypted session, a maximum number of servers connected to over a time window, a maximum number of requests per minute over a time window, a maximum number of time slices in which there was network activity, a probability of a least-probable server accessed, a frequency of requests, time of day, contiguous app usage, contiguous web usage, and requests directed to analytics services.

13. The apparatus of claim 11, wherein the network traffic from a plurality of training client devices includes:
first training network traffic received from one or more network interface controllers, the first network traffic exchanged with a plurality of training client devices over a first time period; and
second training network traffic received from the one or more network interface controllers, the second network traffic exchanged with the plurality of training client devices over a second time period, the second time period associated with a higher predominance of background activity than the first time period.

14. The apparatus of claim 11, wherein the first time and the second time period are dependent on the time of day.

15. The apparatus of claim 11, wherein the network traffic from a plurality of training client devices includes:
- first training network traffic received from one or more network interface controllers, the first network traffic exchanged with a plurality of updated training client devices; and
- second training network traffic received from the one or more network interface controllers, the second network traffic exchanged with a plurality of non-updated training client devices, wherein the non-updated training client devices execute a version of an application that does not perform background activity.

16. At least one non-transitory computer-readable storage medium comprising instructions that, when executed, cause a system to:
- receive monitored network traffic from one or more network interface controllers, the monitored network traffic exchanged with a plurality of client devices over a monitored time period;
- receive a foreground activity profile, the foreground activity profile comprising one or more signals for distinguishing between foreground activity indicative of foreground state of one or more profiled applications and background activity indicative of a background state of the one or more profiled applications, wherein the foreground activity profile is generated using machine learning based on training data generated from network traffic from a plurality of training devices;
- determine one or more active foreground applications in the monitored network traffic based on the foreground activity profile, wherein determining the one or more active foreground applications comprises determining that at least a portion of the monitored network traffic comprises background activity; and
- generate active usage statistics for the one or more profiled applications based on the one or more active foreground applications being active during the monitored time period.

17. The non-transitory computer-readable storage medium of claim 16, the signals comprising one or more of: a maximum amount of data downloaded over a time window, a maximum amount of data uploaded over a time window, a maximum amount of data downloaded in a single request, a maximum amount of data uploaded in a single request, a maximum response time for a network server to respond to a single request, a maximum duration of an encrypted session, a maximum amount of data downloaded in a single encrypted session, a maximum amount of data uploaded in a single encrypted session, a maximum number of servers connected to over a time window, a maximum number of requests per minute over a time window, a maximum number of time slices in which there was network activity, a probability of a least-probable server accessed, a frequency of requests, time of day, contiguous app usage, contiguous web usage, and requests directed to analytics services.

18. The non-transitory computer-readable storage medium of claim 16, wherein the network traffic from a plurality of training client devices includes:
- first training network traffic received from one or more network interface controllers, the first network traffic exchanged with a plurality of training client devices over a first time period; and
- second training network traffic received from the one or more network interface controllers, the second network traffic exchanged with the plurality of training client devices over a second time period, the second time period associated with a higher predominance of background activity than the first time period.

19. The non-transitory computer-readable storage medium of claim 16, the foreground activity profile comprising one or more non-application-specific signals for distinguishing between the foreground activity of the one or more profiled applications and the background activity of the one or more profiled applications.

20. The non-transitory computer-readable storage medium of claim 16, the foreground activity profile comprising one or more application-specific signals for distinguishing between the foreground activity of the one or more profiled applications and the background activity of the one or more profiled applications.

* * * * *